United States Patent Office 3,226,349
Patented Dec. 28, 1965

3,226,349
ETHYLENE-ALPHA OLEFIN POLYMER LATICES
Neville Leverne Cull, Baker, La., assignor to Esso Research and Engineering Company, a corporation of Delaware
No Drawing. Filed Nov. 6, 1961, Ser. No. 150,126
12 Claims. (Cl. 260—29.6)

This invention relates to the preparation of stable latices from rubbery amorphous copolymers of alpha olefins.

It is known to prepare amorphous copolymers of ethylene and alpha olefins by polymerization at relatively low pressures in the presence of an inert liquid organic solvent having dissolved therein a mixture of an aluminum dialkyl halide and vanadium oxytrihalide. Such polymers have excellent aging and ozone-resistant characteristics and are suitable replacements for rubber.

It is now proposed to prepare latices of the above polymers. Therefore, in accordance with this invention a hydrocarbon solution containing 2–10% by weight of a copolymer of ethylene and an alpha olefin prepared by the above catalyst is dispersed in 50 to 100 parts by weight of water per 100 parts by weight of cement containing about 4 to 7 parts per hundred parts of polymer solids (phr.) of a mixture of an anionic and nonionic emulsifier and 0.25 to 2 phr. of a stabilizing agent.

The copolymer used in preparing the latices of the present invention is prepared by copolymerizing ethylene with an alpha olefin such as propylene in the liquid phase by passing the ethylene and propylene or other alpha olefin into an inert liquid organic solvent having the polymerization catalyst dissolved therein. The flow rate of the gases is such that the ratio of ethylene to propylene in the reaction mixture is kept constant.

The catalyst used in the polymerization is formed in situ in the reaction diluent by mixing an aluminum dihydrocarbon halide such as aluminum diethyl chloride with a vanadium oxyhalide, such as vanadium oxytrichloride. Other aluminum dihydrocarbon halides may be used wherein the hydrocarbon group is methyl, ethyl, amyl, isoamyl, hexyl, isohexyl, octyl, 2-ethylhexyl, cyclohexyl, phenyl, benzyl, etc., and wherein the halogen may be chloride, bromine, or iodine. The vanadium oxytrihalide may be the chloride, iodide or bromide. The amount of catalyst formed must be such that it will remain in solution in the polymerization mixture. In general, the rate of addition of the catalyst will preferably be at or below about 2 millimoles of vanadium per liter per hour. The ratio of the aluminum compound to vanadium compound may vary widely but generally will be about 1 to about 12, preferably 3 to 8.

Suitable diluents for the copolymerization are in general the hydrocarbon solvents such as hexane, heptane, octane, nonane, decane, benzene, toluene, xylene, cyclohexane, methylcyclohexane, and the like and the chlorinated hydrocarbons, such as carbon tetrachloride, chlorobenzene, and dichlorobenzene.

The polymerization may be carried out over a wide range of temperature and pressure conditions. In general as the temperature of the reaction increases, the catalyst consumption increases and the molecular weight of the copolymer decreases. Temperatures are generally within the range of 0° and 125° C., preferably 25 to 80° C. Pressures are generally about atmospheric but may range anywhere from 1 to 30 atmospheres.

The preparation of these polymers is described in detail in British Patent No. 857,938 published January 4, 1961, and in an article by Natta et al. in La Chimica e L'Industrie, Volume 39, No. 9:733–743 (1957), entitled "Copolymerization of Ethylene With Aliphatic Alpha-Olefins," to which reference may be made for details concerning catalyst preparation and conditions of reaction. The disclosure of the patent and the article are incorporated herein by reference.

The polymer prepared by the above process is homogeneous in composition and has a narrow molecular weight distribution. That containing from about 25 to about 60 mole percent of propylene has exceptional elastomeric properties which make it suitable as a replacement for rubber.

As prepared the polymer is removed from the reaction zone as a solution in hydrocarbon and generally known as "cement." This cement contains about 2 to 10 wt. percent, usually about 5–6 wt. percent of solid polymer. In accordance with this invention latices of this polymer are formed by dispersing the cement in 50 to 100 wt. percent of water containing about 2 to 10 phr., preferably 4–7 phr., of a mixture of an anionic and a nonionic emulsifier and 0.25 to 2 parts of a stabilizer. The anionic emulsifier is one having the general formula $$R(OCH_2CH_2)_nOSO_3X$$

wherein R is an alkyl, aryl, alkaryl or other cyclic group, $n$ is 4 to 10 and X is a monovalent metal or ammonium. A particularly suitable anionic emulsifier is the sodium sulfate of polyoxyethylated octyl phenol, containing 4 ethylene oxide units. These compounds are prepared by condensing an alkyl phenol or an alcohol with an alkene oxide such as ethylene oxide or propylene oxide, sulfating the resulting condensation product and converting it to the desired salt.

The nonionic emulsifier is a polyether alcohol having the formula $R(OCH_2CH_2)_nOH$ where R is an alkyl, aryl, or alkaryl or other cyclic group, and $n$ is an integer of 4 to 10. These compounds are prepared by condensing an alkyl phenol or an alcohol with an alkene oxide such as ethylene oxide or propylene oxide. The alkene oxide units should represent at least 40% of the total molecular weight of the compound. A particularly useful nonionic emulsifier is polyoxyethylated octyl phenol containing 8 to 10 ethylene oxide units.

It is also necessary to add a stabilizer to the emulsifier system. This stabilizer is suitably a monovalent salt of an ortho-phosphate, e.g., sodium dihydrogen phosphate or the polymerized sodium salts of alkyl aryl and aryl alkyl sulfonic acids, e.g., the sodium salt of toluene sulfonic acid and the sodium salt of styrene sulfonic acid.

The anionic emulsifier may be used in amounts of 1 to 5 phr. and the nonionic emulsifier in amounts of 1 to 4 phr., preferably 2 to 3 phr. The stabilizer is added in amounts of 0.25 to 2 phr., preferably 0.5 to 1.5 phr.

In the practice of the invention the cement as it is received from the reaction zone is emulsified with water in a suitable mixer such as a Dispersator, a colloid mill, a high pressure homogenizer, or a mixer in which high shear action is produced by sound energy such as the Rapisonic and Minisonic homogenizers. After emulsification the crude emulsion of solvent, polymer and water is stripped to remove the solvent. The stripping operation may be carried out at elevated temperatures and pressures until no more solvent can be removed. If a high solids latex is desired some of the water may be removed by vacuum stripping, creaming or centrifuging.

The amount of water contained in the emulsion is not critical as long as there is enough water present to produce a stable water-reducible emulsion.

The latices produced by this procedure contain between about 30 and 50% by weight total solids. This product may be concentrated by the removal of water to a solution containing about 60% by weight solids or it may be diluted to as low a concentration as may be desired.

In order to produce smaller particle size latices, the solvent-stripped latex may be subjected to further emulsification in any of the above-mentioned mixing devices. After this additional mixing the water can be removed from the latex by stripping, creaming or centrifuging.

The latices obtained in accordance with this invention are suitable for use in the preparation of foam rubber, sponge extenders, paper size, paper shades and drapes, tire cord coating compositions, emulsion paints, laminants for paper, wood, canvas and plywood, binder for cork, wood, fiber and leather buffings, industrial gloves and protective clothing, dipped goods and adhesives.

The advantages of the invention will be better understood from a consideration of the following experimental data which are given for the sake of illustration, but without intention of limiting the invention thereto.

Example 1

A copolymer of ethylene and propylene was formed by introducing into a continuous reactor .006 lb. mole of $VOCl_3$/100 lbs. hexane and .002 lb. mole of $AlEt_2Cl$/100 lbs. hexane. These catalyst solutions were each fed into the reactor at the rate of 1–2 ml./hr. Ethylene and propylene are fed into the reactor (68 mole percent propylene) at the rate of 15 lbs./100 lbs. hexane. The temperature was maintained at 100–120° F.

The composition of the off gas was continuously monitored and the ratio of ethylene/propylene in the inlet streams was adjusted as necessary to maintain the composition of the off gas at the level necessary to keep the polymer product homogeneous. The residence time was approximately 0.5–1.0 hr. The reactor effluent was a solution of copolymer in hexane containing 4.7% by weight of polymer.

Example 2

The polymer solution made in accordance with the process of Example 1 was concentrated to a solution containing 10.2 wt. percent polymer and having a viscosity of 10,000 cps. (Brookfield) and 6000 grams were added to 3000 grams of water containing 5 phr. of the sodium sulfate of polyoxyethylated nonyl phenol containing 4 ethylene oxide units and 1 phr. of $NaH_2PO_4$ and introduced into a Dispersator and emulsified. The resulting emulsion was very unstable and could not be used. A similar attempt to form an emulsion with a polymer solution containing 7.9% polymer also failed. However, an attempt using a polymer solution containing 4.7% by weight of polymer was successful and a stable emulsion was obtained. Upon stripping, however, the emulsion was unstable, oiling out and developing a large amount of coagulum.

Example 3

The polymer solution prepared as in Example 1 was deashed to remove catalyst residues and concentrated to a solution containing 8.8 wt. percent of polymer. 6000 grams of the concentrated solution were added to 3000 grams of water containnig 5 phr. of sodium sulfate of polyoxyethylated nonyl phenol containing 4 ethylene oxide units, 2 phr. of polyoxyethylated octyl phenol containing 8 to 10 ethylene oxide units and 1 phr. of $NaH_2PO_4$. This mixture was placed in the Dispersator and agitated for 1 hour and a stable latex was obtained. The solvent was distilled off and the resulting latex was concentrated by further distilling to remove some of the water. A finished, stable latex containing 48% by weight of polymer with a viscosity of 1200 cps. and a pH of 4.9 was obtained.

Example 4

Three latices were prepared by deashing a polymer solution prepared as in Example 1, concentrating it to a solution containing 7.2 wt. percent polymer. This concentrated solution was emulsified with 850 parts by weight of water, based on polymer, using three different emulsifier systems: (a) 5 phr. of the sodium sulfate of polyoxyethylated nonyl phenol (containing 4 ethylene oxide units) and 1 phr. of $NaH_2PO_4$; (b) same except 7 phr. of the sodium sulfate was used; (c) same as (a) except that 2 phr. of polyoxyethylated octyl phenol containing 8 to 10 ethylene oxide units was also present. The latex obtained was then distilled to remove the hexane. The following data were obtained:

| Emulsifier system | (a) | (b) | (c) |
|---|---|---|---|
| Percent coagulation on distilling, wt. percent | 0.5 | nil | nil |
| Residual hexane, wt. percent | 25.2 | 19.8 | 4.6 |

The latex prepared from both emulsifier systems (a) and (b) were difficult to strip, i.e., to remove the solvent, the latex prepared with emulsifier system (b) being particularly so. In both cases high foaming, large amounts of entrainment and poor heat transfer were encountered. The latex prepared in the presence of emulsifier system (c), namely the one in which a combination of anionic and nonionic emulsifiers together with the stabilizer was used, could be distilled to remove hexane without any difficulties.

Example 5

The following experiment was carried out to determine the effect of omitting the $NaH_2PO_4$.

A polymer solution, prepared as in Example 1, was deashed and concentrated to a solution containing 8.0% polymer and having a viscosity of 3300 cps. (Brookfield viscosity at 10 r.p.m. using a #3 spindle). 6000 grams of the concentrated polymer were added slowly to 3700 grams of water (hydrocarbon/water volume ratio of 70/30) containing 5 phr. of the sodium sulfate of polyoxyethylated nonyl phenol (4 ethylene oxide units) and 2 phr. of polyoxyethylated octyl phenol (8–10 ethylene oxide units). Stirring was achieved with a 3 in. duplex Dispersator. After 1 hour it was apparent that a satisfactory latex could not be produced due to an excessively large amount of the polymer oiling out.

When this experiment was repeated and similar results were being obtained after about half of the polymer solution had been added, 4.0 grams of $NaH_2PO_4$ (1 phr.) was then added and the remainder of the polymer solution stirred in. A very good latex was then obtained.

Example 6

A sample of polymer prepared as in Example 1 was deashed and concentrated to 9.0% solids (Brookfield viscosity #3 spindle @ 10 r.p.m.=2200 cps.). Twenty-one hundred cc. (1400 grams) of this cement was emulsified with 900 grams of $H_2O$ (70/30 vol. percent $HC/H_2O$ ratio) using 5 phr. of a polyoxyethylated octyl phenol containing 8–10 ethylene oxide units and 1 phr. of $NaH_2PO_4$. This mixture was stirred on the Dispersator for 1 hr. The resulting raw latex was then hexane stripped. During hexane stripping the latex coagulated. This experiment shows the necessity for having the sodium sulfate of the polyoxyethylated nonyl phenol present.

The above examples show that it is necessary to use a combination of an anionic and a nonionic emulsifier together with a stabilizer if a latex which remains stable upon removing the solvent is to be obtained. Sometimes when the nonionic emulsifier is omitted no emulsion is obtained at all, as shown in Example 2. At other times an emulsion is formed, but is unstable when distilled to separate the solvent (Examples 2 and 4). It is also necessary to have a stabilizer present as shown in Example 5.

The nature and objects of the present invention having been thus fully set forth and specific examples of the same given, what is claimed as new and useful and desired to be secured by Letters Patent is:

1. A method for preparing a stable copolymer latex, said copolymer having been prepared by copolymerizing ethylene and an alpha-olefin in the presence of an inert liquid organic solvent and an aluminum dihydrocarbon halide-vanadium oxyhalide catalyst formed in situ in the inert liquid organic solvent and recovering a 2–10 wt. percent solution of the copolymer in the inert liquid organic solvent, comprising the steps of:

(1) emulsifying each 100 parts by weight of the copolymer in said solution with 50 to 100 parts by weight of an aqueous system containing:
  (a) 1 to 5 parts by weight of an anionic emulsifier, based on the copolymer, said anionic emulsifier having the general formula $$R(OCH_2CH_2)_nOSO_3X$$

where R is a radical chosen from the group consisting of alkyl, alkaryl and other cyclic, $n$ is 4 to 10 and X is chosen from the group consisting of monovalent metals and ammonium,
  (b) 1 to 4 parts by weight of a nonionic emulsifier, based on the copolymer, said nonionic emulsifier having the general formula $$R(OCH_2CH_2)_nOH$$

where R is chosen from the group consisting of alkyl, aryl, alkaryl and other cyclic, and $n$ is 4 to 10, and
  (c) 0.25 to 2 parts by weight, based on the copolymer, of sodium dihydrogen phosphate;
(2) stripping off said inert organic liquid solvent; and
(3) recovering a stable copolymer latex containing 30 to 50 wt. percent solids.

2. The method of claim 1 in which the anionic emulsifier is the sodium sulfate of polyoxyethylated nonyl phenol containing 4 ethylene oxide units; and the nonionic emulsifier is polyoxyethylated octyl phenol containing 8 to 10 ethylene oxide units.

3. The method of claim 1 in which the alpha-olefin is propylene.

4. The method of claim 3 in which the anionic emulsifier is the sodium sulfate of polyoxyethylated nonyl phenol containing 4 ethylene oxide units; and the nonionic emulsifier is polyoxyethylated octyl phenol containing 8 to 10 ethylene oxide units.

5. The method of claim 1 in which the copolymer is deashed to remove catalyst residues prior to the emulsification step.

6. A method for preparing a stable latex of a rubbery copolymer, said rubbery copolymer having been prepared by copolymerizing ethylene and an alpha-olefin in the presence of an inert liquid organic solvent and an aluminum dihydrocarbon halide-vanadium oxyhalide catalyst formed in situ in the inert liquid organic solvent and recovering a 2–10 wt. percent solution of the rubbery copolymer in the inert liquid organic solvent, comprising the steps of:

(1) emulsifying each 100 parts by weight of the rubbery copolymer in said solution with 50 to 100 parts by weight of an aqueous system containing:
  (a) 4 to 7 parts by weight, based on the rubbery copolymer, of a mixture consisting of an anionic emulsifier and 2 to 3 parts of a nonionic emulsifier, said anionic emulsifier having the general formula $$R(OCH_2CH_2)_nOSO_3X$$

where R is a radical chosen from the group consisting of alkyl, aryl, alkaryl and other cyclic, $n$ is 4 to 10 and X is chosen from the group consisting of monovalent metals and ammonium, and said nonionic emulsifier having the general formula $$R(OCH_2CH_2)_nOH$$

where R is a radical chosen from the group consisting of alkyl, aryl, alkaryl and other cyclic and $n$ is 4 to 10, and
  (b) 0.5 to 1.5 parts by weight, based on the rubbery copolymer, of sodium dihydrogen phosphate;
(2) stripping off said inert organic liquid solvent; and
(3) recovering a stable rubbery copolymer latex containing 30 to 50 wt. percent solids.

7. The method of claim 6 in which the rubbery copolymer is deashed to remove catalyst residues prior to the emulsification step.

8. The method of claim 6 in which the anionic emulsifier is the sodium sulfate of polyoxyethylated nonyl phenol containing 4 ethylene oxide units and the nonionic emulsifier is polyoxyethylated octyl phenol containing 8 to 10 ethylene oxide units.

9. The method of claim 6 in which the alpha-olefin is propylene.

10. The method of claim 9 in which the anionic emulsifier is the sodium sulfate of polyoxyethylated nonyl phenol containing 4 ethylene oxide units; and the nonionic emulsifier is polyoxyethylated octyl phenol containing 8 to 10 ethylene oxide units.

11. A stable latex of a rubbery copolymer of ethylene and an alpha-olefin comprising in parts per 100 parts of said copolymer:

An anionic emulsifier having the formula $$R(OCH_2CH_2)_nOSO_3X$$

where R is a hydrocarbon chosen from the group consisting of alkyl, aryl, alkaryl and other cyclic, $n$ is 4 to 10, and X is chosen from the group consisting of monovalent metals and ammonium ____ 1–5

A nonionic emulsifier having the formula $$R(OCH_2CH_2)_nOH$$

where R is chosen from the group consisting of alkyl, aryl, alkaryl and other cyclic, and $n$ is 4 to 10 _____ 1–4
Sodium dihydrogen phosphate _____ 0.25–2
Water _____ 50–100

12. The composition of claim 7 in which the rubbery copolymer consists of 40–75 mole percent ethylene and 25–60 mole percent propylene.

References Cited by the Examiner

UNITED STATES PATENTS

| 2,936,295 | 5/1960 | Brodkey et al. | 260—29.7 |
| 2,947,715 | 8/1960 | Charlet et al. | 260—29.7 |

FOREIGN PATENTS

| 857,938 | 1/1961 | Great Britain. |

MURRAY TILLMAN, *Primary Examiner.*

LEON J. BERCOVITZ, *Examiner.*